US007702341B2

(12) United States Patent
Henderson et al.

(10) Patent No.: US 7,702,341 B2
(45) Date of Patent: Apr. 20, 2010

(54) SHORTCUT FOR ESTABLISHING A COMMUNICATION CHANNEL WITH A REMOTE DEVICE OVER A NETWORK

(75) Inventors: Irvin Henderson, Palo Alto, CA (US); Naveen Dasa Sanjeeva, Milpitas, CA (US); Thyagarajapuram S. Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 393 days.

(21) Appl. No.: 11/242,486

(22) Filed: Oct. 3, 2005

(65) Prior Publication Data

US 2007/0077949 A1  Apr. 5, 2007

(51) Int. Cl.
*H04W 4/00* (2009.01)
(52) U.S. Cl. .................................... 455/466
(58) Field of Classification Search ............... 455/466, 455/11.1, 445, 434, 410, 435.1, 435.2, 411; 370/328, 349, 496
See application file for complete search history.

(56) References Cited

U.S. PATENT DOCUMENTS

| 5,758,088 | A | 5/1998 | Bezaire et al. |
| 6,021,433 | A | 2/2000 | Payne et al. |
| 6,167,426 | A | 12/2000 | Payne et al. |
| 6,735,614 | B1 | 5/2004 | Payne et al. |
| 7,295,836 | B2 * | 11/2007 | Yach et al. .................. 455/415 |
| 7,308,261 | B2 * | 12/2007 | Henderson et al. ....... 455/435.1 |
| 2002/0062345 | A1 * | 5/2002 | Guedalia et al. ............ 709/204 |
| 2005/0090239 | A1 * | 4/2005 | Lee et al. ..................... 455/418 |
| 2005/0250439 | A1 * | 11/2005 | Leslie ........................ 455/11.1 |
| 2006/0030292 | A1 * | 2/2006 | Bosworth et al. ........... 455/408 |
| 2006/0199598 | A1 * | 9/2006 | Lee et al. .................... 455/466 |

* cited by examiner

*Primary Examiner*—Melody Mehrpour
(74) *Attorney, Agent, or Firm*—Darby & Darby P.C.; John W. Branch

(57) ABSTRACT

Two-way communication between a general purpose computing device, such as a PC, and a mobile terminal, such as a cell phone. The general device executes a conversation user interface through which a user enters a message. The message is sent to an intermediary communication service, such as a portal server, along with a mobile terminal identifier, such as a phone number. The intermediary service creates a mapping between the mobile identifier, a general device user identifier, and an extension to an intermediary device identifier, such as an extension to an SMS short code. The intermediary service sends the message to the mobile terminal along with the intermediary service identifier and the extension. The mobile device returns a response with the mobile identifier, the intermediary service identifier, and the extension. The intermediary service uses the mobile identifier and the extension to determine the general device user identifier and send the response.

19 Claims, 5 Drawing Sheets

SHORTCUT FOR ESTABLISHING A COMMUNICATION CHANNEL WITH A REMOTE DEVICE OVER A NETWORK

FIELD OF THE INVENTION

The present invention relates generally to mobile communications, and more particularly, but not exclusively, to two-way communication between a general purpose computing device and a mobile terminal.

BACKGROUND OF THE INVENTION

Email is considered a store-and-forward technology in which a message is stored by a server of a network center and forwarded to a target device when the target device is powered and connected to a network such as the Internet. Email messages are usually not limited in length. Computer and Internet companies developed instant messaging (IM) to provide direct, two-way text and graphics messaging. Instant messaging is generally considered a distinctly Internet product, and also usually does not place any limit on the length of messages. Instant messages are generally not stored and forwarded like conventional email. Instead, instant messages are typically handled through a central server in a protocol that is usually separate from email or web traffic to provide direct communication between clients. Users typically run a resident client application that provides IM services.

Wireless phone companies developed short message service (SMS) to provide a text messaging compliment to voice communication services. SMS was generally designed for the thinner communication channel of the wireless environment. Message length is usually limited (typically 80 or 160 characters), and the receiver must have a compatible mobile phone. Messages are usually handled by a network center, since SMS is a store-and-forward technology. In the case of SMS, a message is temporarily stored by a server of the network center and forwarded to a mobile device when the mobile device is powered and connected to a network such as a cellular network.

Although SMS is considered a store-and-forward technology, SMS messages are delivered to the mobile client whenever the mobile device is powered and connected to the network, rather than when the user launches a client message service like email. Thus, SMS and IM systems allow users to send messages that are generally faster and more intrusive than email or other text messaging systems. Instead of waiting for the receiver to check a message center (mailbox), these messages are delivered whenever the receiver is accessible by a message server.

Instant wireless is a wireless version of instant text messaging in which information is being sent through wireless networks in real-time, rather than being handled through a store-and-forward mechanism. As indicated above, store-and-forward delivery is traditionally used in many email and batched transaction handling systems. Typically, a message is stored in a server and then after a pre-defined delay, it is processed and sent to the destination server where it is picked up by the recipient. Instant wireless may be considered a one-way, real-time, digital telephone message conversation (not voice) with an answering machine, using a wireless network. It is considered communication with an answering machine, because the recipient at his/her option may not respond instantly. Since the communication channel does not necessarily stay open between sender and recipient, instant wireless is generally not considered true two-way communication. However, instant wireless does send messages instantly, rather than wait for a batch to accumulate. A prerequisite to instant wireless is that the destination device is turned on and connected through wireline or wireless connection. It generally takes less effort to write code for instant messaging than it is for store-and-forward messaging. It is also generally more efficient with regard to processing costs. However, instant wireless generally requires a more costly infrastructure.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, the present invention is directed towards providing a method and system for controlling a mode of communication with another user based on a presence status.

Illustrative Operating Environment

Figure 1:
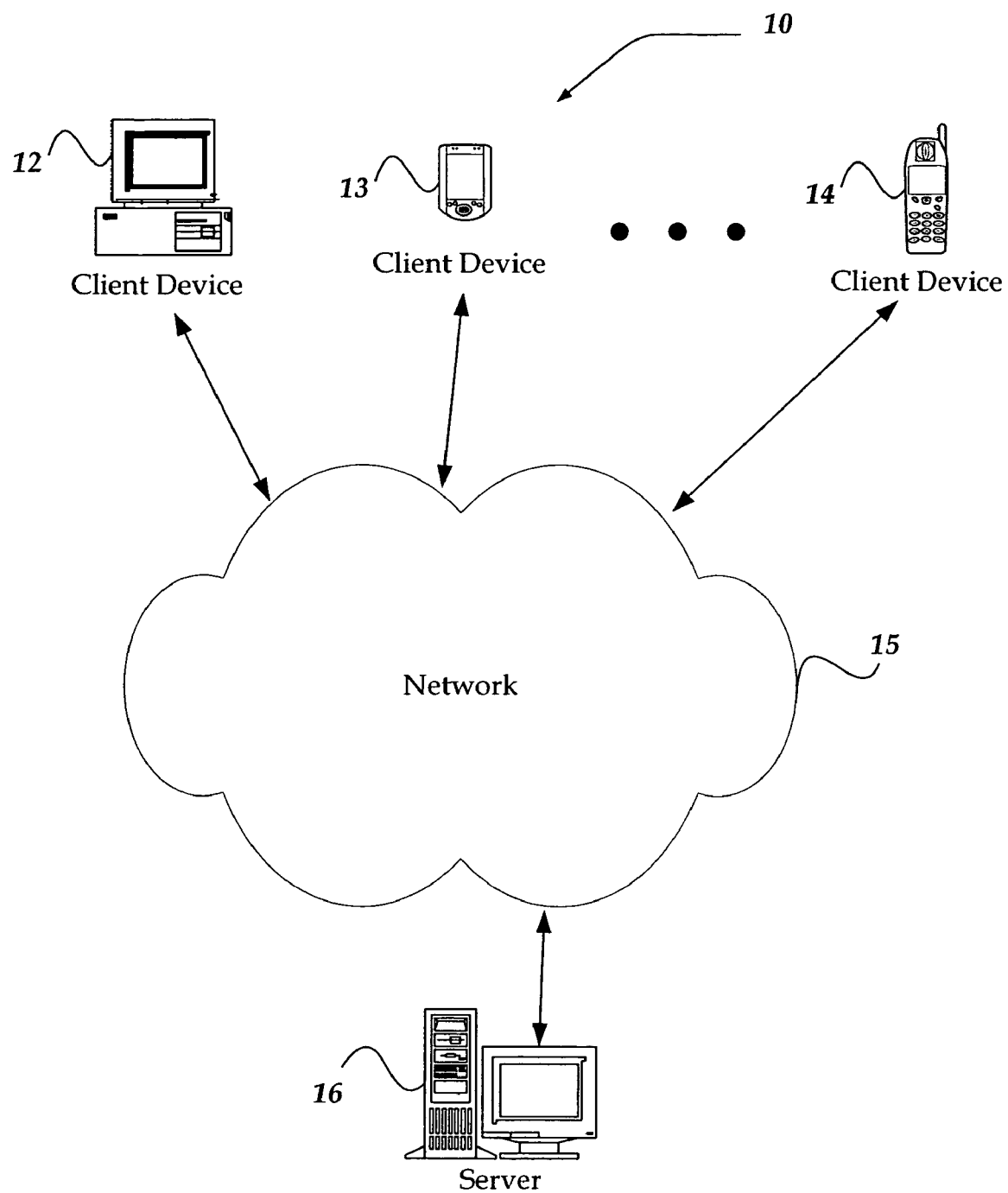
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, and a server 16. Network 15 is in communication with and enables communication between each of client devices 12-14, and server 16.

Client devices 12-14 may include virtually any computing device capable of receiving and sending a message over a network, such as network 15, to and from another computing device, such as server 16, each other, and the like. The set of such devices may include mobile terminals that are usually considered more specialized devices and that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. The set of such devices may also include devices that are usually considered general purpose devices and that typically connect using a wired communications medium such as personal computers, multiprocessor systems, microprocessor-based or programmable consumer electronics, network PCs, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to control settings, such as presence settings, and to instruct the client device to perform operations. Each client device also includes a communication interface that enables the client device to send and receive messages from another computing device employing the same or a different communication mode, including, but not limited to email, SMS, MMS, IM, internet relay chat (IRC), Mardam-Bey's internet relay chat (mIRC), Jabber, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 15 includes any communication method by which information may travel between client devices 12-14, and server 16. Network 15 is constructed for use with various communication protocols including transmission control protocol/internet protocol (TCP/IP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of a general purpose client computing device, such as a client device 20, is described in more detail below in conjunction with FIG. 2. Briefly, client device 20 may include any computing device capable of connecting to network 15 to enable a user to communicate with other client devices and/or server 16. Client device 20 may include many more components than those shown. The components shown, however, are sufficient to disclose an illustrative embodiment for practicing the invention. Many of the components of client device 20 may also be duplicated in server 16 and/or other server devices.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX or LINUX™. The operating system may also include, or interface with a Java virtual machine module that enables control of hardware components and/or operating system operations via Java application programs.

Mass memory 24 further includes one or more data storage units 32, which can be utilized by client device 20 to store, among other things, programs 34 and/or other data. Programs 34 may include computer executable instructions which can be executed by client device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

Figure 2:
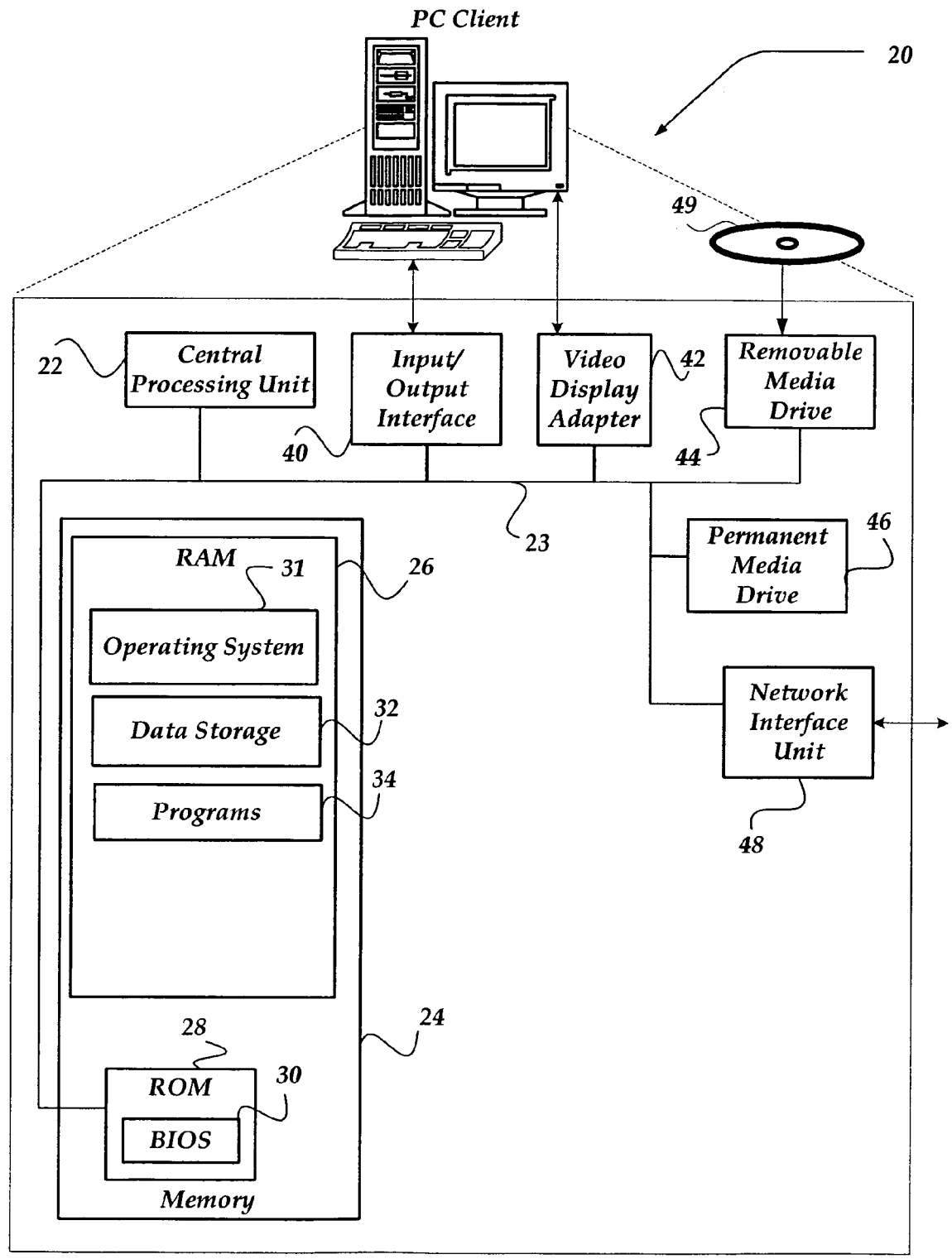
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31 and/or programs 34. Interaction with the user interface includes visual interaction via a display, and a video display adapter 42.

For higher capability client devices such as a personal computer, client device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 49, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 44, client device 20 can communicate with a wide area network such as the Internet, a local area network, a wired telephone network, a cellular telephone network, or some other communications network, such as network 15 in FIG. 1. Network communication interface unit 44 is sometimes known as a transceiver, transceiving device, network interface card (NIC), and the like.

Figure 3:
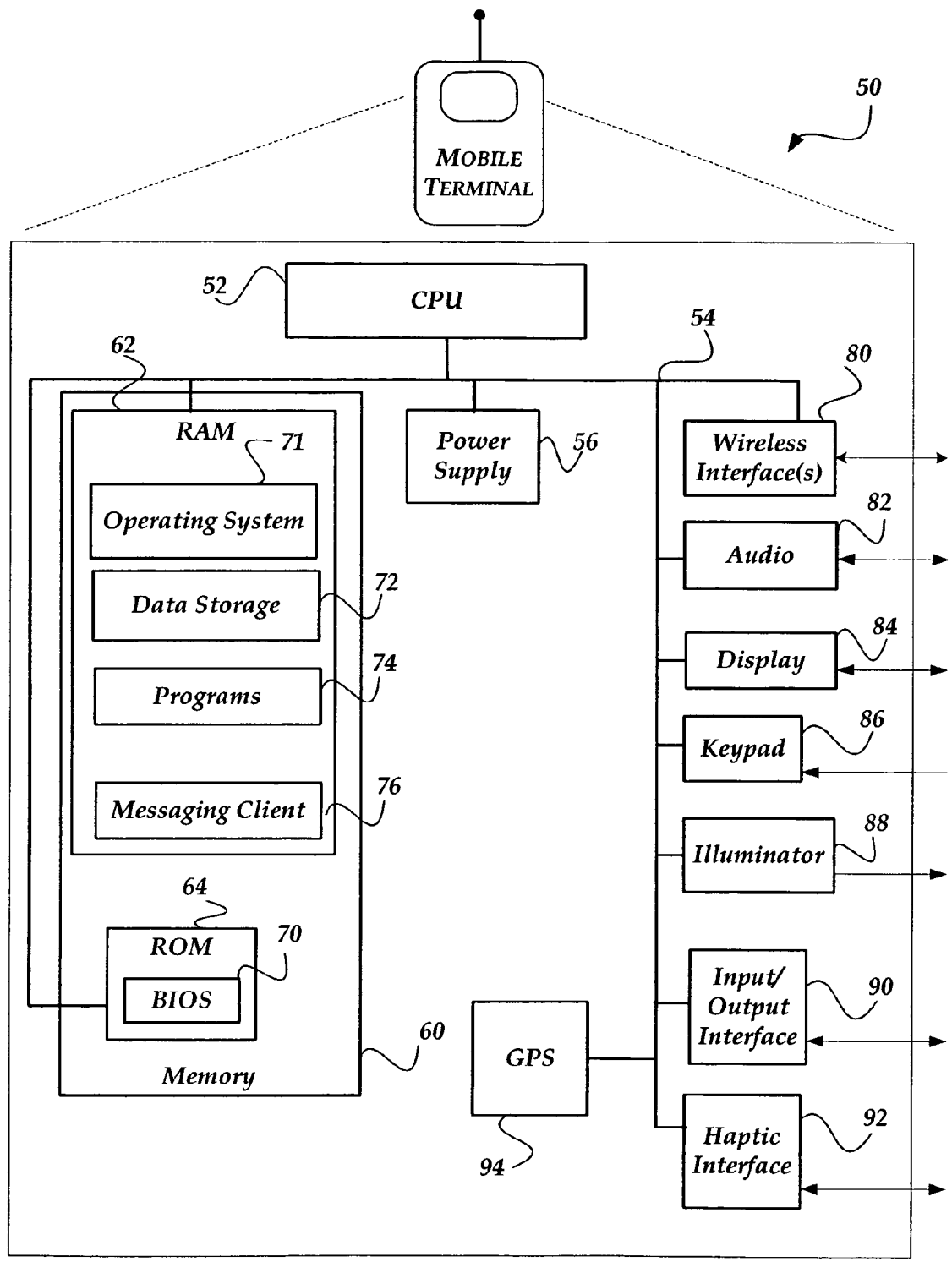
FIG. 3 shows one embodiment of a mobile terminal device that may be included in a system implementing the invention.

FIG. 3 shows an exemplary mobile terminal 50, according to one embodiment of the invention. In one embodiment, mobile terminal 50 is a cellular telephone that is arranged to send and receive voice communications and messages such as SMS messages via one or more wireless communication interfaces. Generally, mobile terminal 50 may comprise any personally mobile electronic device. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Such devices include cellular telephones, smart phones, pagers, radio frequency (RF) devices, infrared (IR) devices, integrated devices combining one or more of the preceding devices, and the like. Mobile terminal 50 may also comprise other electronic devices that such as Personal Digital Assistants (PDAs), handheld computers, personal computers, multiprocessor systems, microprocessor-based or programmable consumer electronics, network PCs, wearable computers, and the like.

Mobile terminal 5 may include many more components than those shown in FIG. 3. However, the components shown are sufficient to disclose an illustrative embodiment for practicing the present invention. As shown in the figure, mobile terminal 50 includes a processing unit 52 in communication with a mass memory 60 via a bus 54.

Mass memory 60 includes a RAM 62, a ROM 64, and other storage means. Mass memory 60 illustrates another example of computer storage media for storage of information such as computer readable instructions, data structures, program modules or other data. Mass memory 60 stores a basic input/output system ("BIOS") 70 for controlling low-level operation of mobile terminal 50. The mass memory also stores an operating system 71 for controlling the operation of mobile terminal 50. It will be appreciated that this component may include a general purpose operating system such as a version of UNIX, or LINUX™, or a specialized mobile communication operating system such as Windows Mobile™, or the Symbian® operating system. The operating system may include, or interface with a Java virtual machine module that enables control of hardware components and/or operating system operations via Java application programs.

Memory 60 further includes one or more data storage units 72, which can be utilized by mobile terminal 50 to store, among other things, programs 74 and/or other data. Programs 74 may include computer executable instructions which, when executed by mobile terminal 50, transmit, receive, and/or otherwise process web pages, audio, video, and enable telecommunication with another user of another mobile device. Other examples of application programs include calendars, contact managers, task managers, transcoders, database programs, word processing programs, spreadsheet programs, games, and so forth. In addition, mass memory 60 stores software messaging client 76. Software messaging client 76 may include computer executable instructions, which may be run under control of operating system 71 to enable and manage SMS, MMS, IM, email, and/or other messaging services for mobile terminal 50.

Mobile terminal 50 also includes a power supply 56, one or more wireless interfaces 80, an audio interface 82, a display 84, a keypad 86, an illuminator 88, an input/output interface 90, a haptic interface 92, and an optional global positioning systems (GPS) receiver 94. Power supply 56 provides power to mobile terminal 50. A rechargeable or non-rechargeable battery may be used to provide power. The power may also be provided by an external power source, such as an AC adapter or a powered docking cradle that supplements and/or recharges a battery.

Mobile terminal 50 may optionally communicate with a base station (not shown), or directly with another mobile device. Wireless interface 90 includes circuitry for coupling mobile terminal 50 to one or more wireless networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), Wireless Application Protocol (WAP), ultra wide band (UWB), IEEE 802.16 Worldwide Interoperability for Microwave Access (WiMax), and the like.

Audio interface 82 is arranged to produce and receive audio signals such as the sound of a human voice. For example, audio interface 82 may be coupled to a speaker and microphone (not shown) to enable telecommunication with others and/or generate an audio acknowledgement for some action. Display 84 may be a liquid crystal display (LCD), gas plasma, light emitting diode (LED), or any other type of display used with a mobile device. Display 84 may also include a touch sensitive screen arranged to receive input from an object such as a stylus or a digit from a human hand.

Keypad 86 may comprise any input device arranged to receive input from a user. For example, keypad 86 may include a push button numeric dial, or a keyboard. Keypad 86 may also include command buttons that are associated with selecting and sending images. Illuminator 88 may provide a status indication and/or provide light. Illuminator 88 may remain active for specific periods of time or in response to events. For example, when illuminator 848 is active, it may backlight the buttons on keypad 86 and stay on while the mobile device is powered. Also, illuminator 88 may backlight these buttons in various patterns when particular actions are performed, such as dialing another mobile device. Illuminator 88 may also cause light sources positioned within a transparent or translucent case of the mobile device to illuminate in response to actions.

Mobile terminal 50 also comprises input/output interface 90 for communicating with external devices, such as a headset, or other input or output devices not shown in FIG. 1. Input/output interface 90 can utilize one or more communication technologies, such as USB, infrared, Bluetooth™, and the like. Haptic interface 92 is arranged to provide tactile feedback to a user of the mobile terminal. For example, the haptic interface may be employed to vibrate mobile terminal 50 in a particular way when another user of a mobile device is calling.

Optional GPS transceiver 94 can determine the physical coordinates of mobile terminal 50 on the surface of the Earth, which typically outputs a location as latitude and longitude values. GPS transceiver 94 can also employ other geo-positioning mechanisms, including, but not limited to, triangulation, assisted GPS (AGPS), E-OTD, CI, SAI, ETA, BSS and the like, to further determine the physical location of mobile terminal 50 on the surface of the Earth. It is understood that under different conditions, GPS transceiver 94 can determine a physical location within millimeters for mobile terminal 50; and in other cases, the determined physical location may be less precise, such as within a meter or significantly greater distances.

Exemplary Logic

Figure 4:
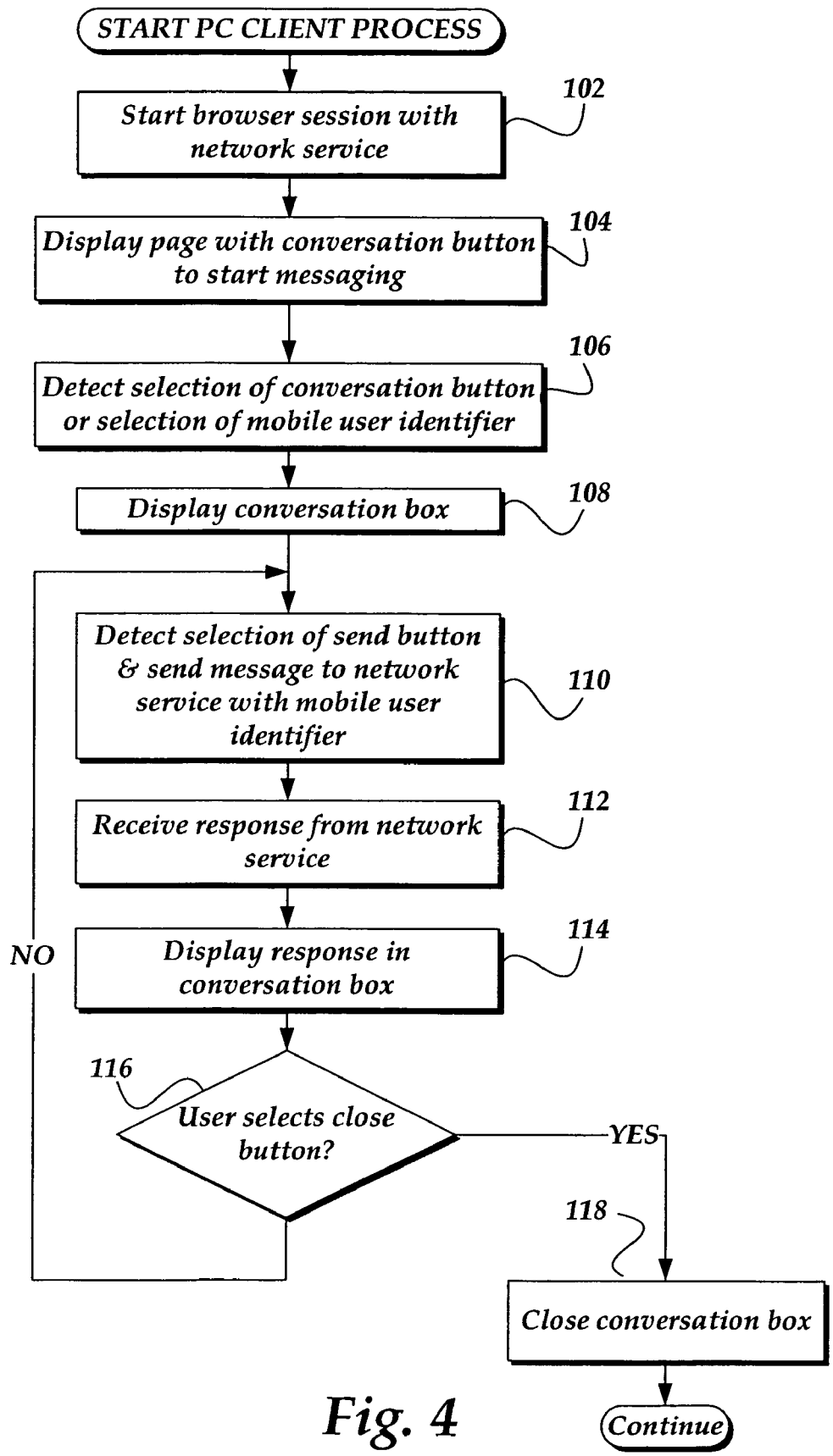
FIG. 4 is a flow diagram illustrating exemplary logic operations performed by a client, such as a general purpose PC.

FIG. 4 is a flow diagram illustrating exemplary logic operations performed by a client, such as a general purpose PC. At an operation 102, a user starts a browser session with a network service such as a portal. For instance, the user may sign into the network service through a web page with a user ID and password. Starting the browser session also establishes a session ID to distinguish this communication session from other sessions that the user may have or establish with the network service. Multiple sessions might be desired to hold multiple conversations with various parties.

At an operation 104, the client displays a web page that enables the user to initiate a conversation with a mobile user. The web page may include a conversation button that enables the user to initiate a text or other conversation with another user. Alternatively, or in addition, the web page may include a list of other users that can be contacted, such as an online address book. A conversation button may be displayed next to each other user on the list, or the user may select a listed user's name or other identifier, such as a mobile phone number. Thus, initiating a conversation may be performed in multiple ways. At an operation 106, the client detects the user's selection of the conversation button, name, phone number, or the like. The client displays a conversation box at an operation 108. The conversation box may appear as a message entry box in a separate window, in a separate frame of the web page, in the same frame as the web page, or in other forms. Java, Javascript, dynamic hypertext markup language (DHTML), or other coding means can be used to implement the conversation box. The conversation box generally includes a send button and/or other controls.

The client user enters a message via the conversation box. The message can include text, emoticons, audio, and/or other forms of communication that are supported by the network service and/or a target mobile terminal. At an operation 110, the client detects that the user activated the send button, and communicates the message to the network service. The message may be communicated as a hypertext transfer protocol (HTTP) message, an instant message, a markup language form, or other format. The client also sends a mobile user identifier such as a cellular telephone number, a mobile identification number (MIN), or other means to identify the target mobile user. The mobile identifier may be typed into a field of the conversation box, selected from the list of mobile users, or otherwise provided. The client or the network service may optionally translate the entered message into a form that is supported by the target mobile terminal.

The network service communicates the message to the mobile user and awaits a response. If a response is returned, the response is communicated to the client at an operation 112. The client displays the response in the conversation box at an operation 114. The client also generally identifies the responder with the cellular telephone number, MIN, or other means to identify the responding mobile user. If the client user chooses to end the conversation, the client detects activation of a close button or other control at a decision operation 116. The client then closes the conversation box at an operation 118. However, if the user continues the conversation, control returns to operation 110 as the user sends another message.

Figure 5:
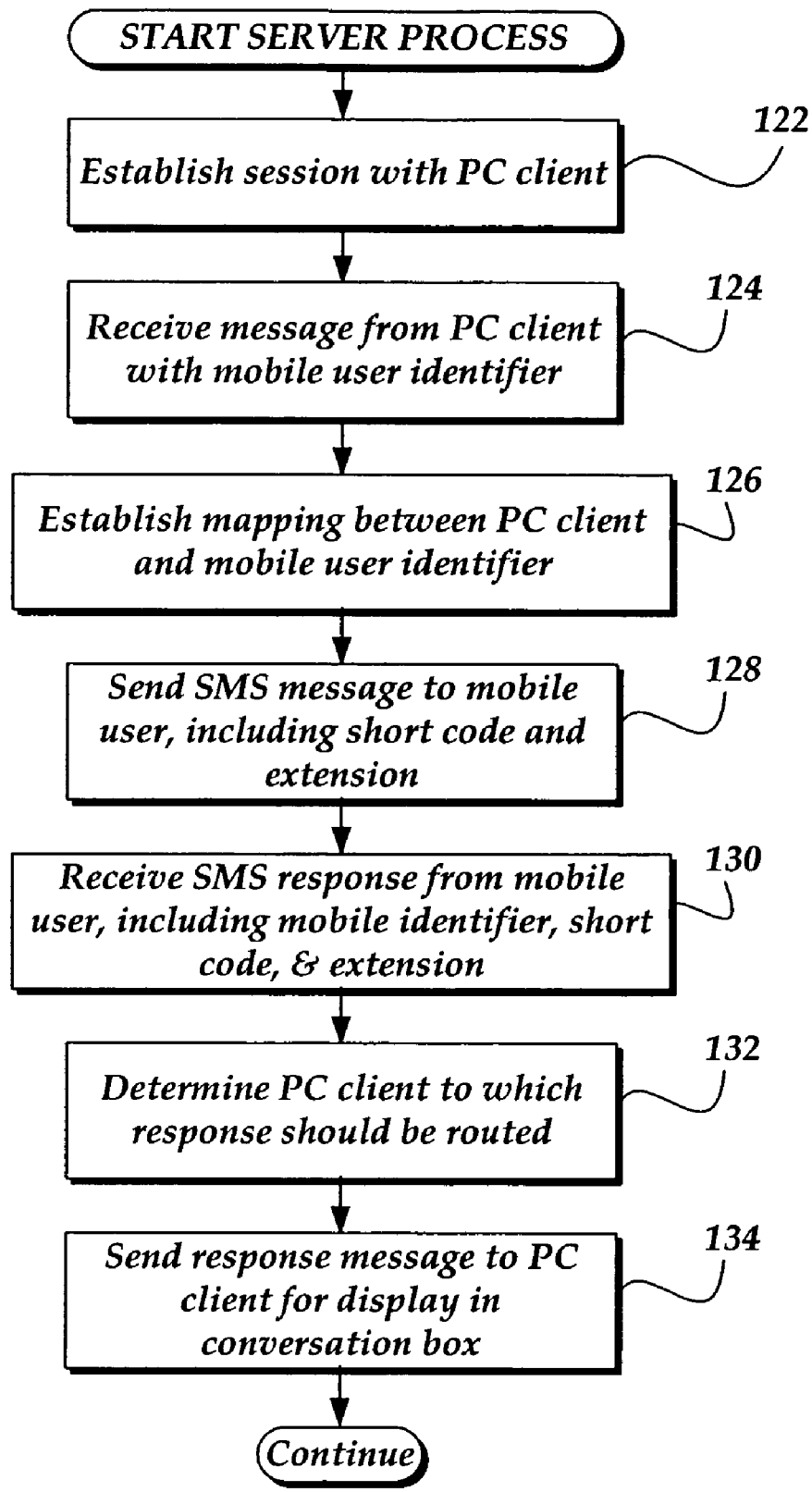
FIG. 5 is a flow diagram illustrating exemplary logic operations performed by the network service, such as a portal server.

FIG. 5 is a flow diagram illustrating exemplary logic operations performed by the network service, such as a portal server. At an operation 122, the network service responds to a request from the client to establish a communication session. The network service may authenticate and/or validate the client and/or user upon sign in. One or more web pages may be transmitted to the client browser automatically or upon request from the user. For example, the user may request a page comprising the user's online address book of contact information. The network service may also transmit a page that includes an applet or other code for the conversation box. Alternatively, the network service may transmit one or more separate modules of code to implement the conversation box.

At an operation 124, the network service receives a message and mobile user identifier from the client. The network service establishes a mapping between the client and the mobile user at an operation 126. In one embodiment, the mapping generally comprises a relationship between the client user ID, an SMS short code identifying a communication address of the network service, a short code extension number, and the mobile user identifier. The relationship can also include the session identifier or a separate relationship can be established to associate the mobile user with a certain communication session with the client. Table A illustrates sample elements of the relationship.

TABLE A

Sample Relationship Mapping

| Client user ID | Network Service Short Code | Extension | Mobile User ID | Session ID |
|---|---|---|---|---|
| user1 | 92466 | 501 | 555-123-4567 | 127.0.0.1 |

At an operation 128, the network service establishes communication with the mobile user terminal and sends the message to the mobile user at the mobile user ID number. The network service also sends the short code and extension. The message to the mobile user may be reformatted and/or sent via a difference communication protocol. For example, the message may be sent to the mobile user as an SMS message, a multi media service (MMS) message, an IM, a voice IM, a wireless application protocol (WAP) message, and the like. For discussion purposes, the embodiment described herein uses an SMS message.

If the mobile user sends a response to the SMS short code, the network service checks for the extension to the short code at an operation 130. The network service also detects the mobile user ID of the responding mobile terminal. At an operation 132, the network service consults the relationship mapping to determine the client user ID associated with the mobile user ID and extension. The network service, or a separate communication interface determines the corresponding session ID for the appropriate communication channel to the client. If necessary, the network service translates the response into a format that can be communicated to the client such as HTTP message, a markup language form element, an IM, and the like. The network service then sends the response message to the client at an operation 134 for display in the conversation box.

The above specification, examples, and data provide a complete description of the manufacture and use of the composition of the invention. For example, the network service can communicate act as an intermediary to a communication service, such as an SMS server, to provide the relationship mapping, translation, and/or other services. The network service, or another intermediary service can also be used to store, compared, filter, and otherwise preprocess presence information, communication modes, and messages. Since many embodiments of the invention can be made without departing from the spirit and scope of the invention, the invention resides in the claims hereinafter appended.

What is claimed as new and desired to be protected by Letters Patent of the United States is:

1. A method for employing an intermediate server to enable messaging between a general purpose computing device and a mobile terminal, comprising, at the intermediate server:
   establishing a communication session with the general purpose computing device wherein a user identifier received from the general purpose computing device is associated with the general purpose computing device;
   receiving a message and a mobile terminal identifier from the general purpose computing device via a conversation user interface that is temporarily executed by the general purpose computing device;
   storing at least during the communication session an association between the user identifier, the mobile terminal identifier, and a return identifier extension established by the intermediate server, wherein storing the association includes establishing a relationship mapping with a plurality of elements, the elements comprising the user identifier, the mobile terminal identifier, and the return identifier extension;
   sending the message, a return identifier, and the return identifier extension to the mobile terminal;
   receiving a response to the message sent to the mobile terminal, wherein the response is transmitted from the mobile terminal and returns the mobile terminal identifier, the return identifier, and the return identifier extension from the mobile terminal to the intermediate server;
   using the return identifier extension and the mobile terminal identifier received with the response to associate the response with the user identifier, wherein the association of the response with the user identifier is based at least in part on the relationship mapping; and
   sending the response to the general purpose computing device based on the user identifier.

2. The method of claim 1, further comprising:
   associating the user identifier with a session identifier that is associated with the communication session with the general purpose computing device; and
   using the return identifier extension, the mobile terminal identifier, and the user identifier to associate the response with the communication session with the general purpose computing device.

3. The method of claim 1, wherein the response is displayed with the conversation user interface.

4. The method of claim 1, wherein the mobile terminal identifier comprises one of a telephone number and a mobile identification number.

5. The method of claim 1, wherein the return identifier comprises a short message service (SMS) short code.

6. The method of claim 1, wherein the message is formatted to conform to a wide area network protocol when received from the general purpose computing device.

7. The method of claim 6, wherein the message comprises one of a hypertext transport protocol (HTTP) message, an instant message (IM), and a markup language form element.

8. The method of claim 1, further comprising formatting the message to comply with a mobile messaging specification before sending the message to the mobile terminal.

9. The method of claim 8, wherein the text messaging specification comprises one of SMS, MMS, IM, voice IM, and wireless application protocol (WAP).

10. The method of claim 1, further comprising formatting the response to comply with a wide area network protocol before sending the response to the general purpose computing device.

11. The method of claim 1, wherein the conversation user interface comprises one of an applet, a markup language form, and a script.

12. A computer readable medium, comprising executable instructions for performing actions, including the actions of claim 1.

13. A server for messaging between a general purpose computing device and a mobile terminal, comprising:
   a processor;
   a communication interface in communication with the processor for communication between the server, the general purpose computing device, and the mobile terminal; and
   a memory in communication with the processor and storing machine instructions that cause the processor to perform a plurality of operations, including:
   establishing a communication session with the general purpose computing device wherein a user identifier is associated with the general purpose computing device;

receiving a message and a mobile terminal identifier from the general purpose computing device via a conversation user interface that is temporarily executed by the general purpose computing device;

storing at least during the communication session an association between the user identifier, the mobile terminal identifier, and a return identifier extension;

sending the message, a return identifier, and the return identifier extension to the mobile terminal;

receiving a response, the mobile terminal identifier, the return identifier, and the return identifier extension from the mobile terminal;

using the return identifier extension and the mobile terminal identifier to associate the response with the user identifier; and sending the response to the general purpose computing device based on the user identifier.

14. The server of claim 13, wherein the machine instructions further cause the processor to perform the operations of:

associating the user identifier with a session identifier that is associated with the communication session with the general purpose computing device; and using the return identifier extension, the mobile terminal identifier, and the user identifier to associate the response with the communication session with the general purpose computing device.

15. The server of claim 13, wherein the machine instructions further cause the processor to perform the operation of formatting the message to comply with a mobile messaging specification before sending the message to the mobile terminal.

16. The server of claim 13, wherein the machine instructions further cause the processor to perform the operation of formatting the response to comply with a wide area network protocol before sending the response to the general purpose computing device.

17. A general purpose client computing device comprising:
a communication interface;
a processor in communication with the communication interface; and
a memory in communication with the processor and storing machine instructions that cause the processor to perform a plurality of operations, including:
establishing a communication session with an intermediate server wherein a user identifier is associated with the general purpose computing device;
temporarily executing a conversation user interface during the communication session;
sending a message and a mobile terminal identifier to the intermediate server via the conversation user interface, wherein the intermediate server associates the user identifier and the mobile terminal identifier with a return identifier extension established by the intermediate server, and wherein the association comprises a relationship mapping including the user identifier, the mobile terminal identifier, and the return identifier extension, and wherein the intermediate server sends the message, including a return identifier and the return identifier extension, to a mobile terminal identified by the mobile terminal identifier;
receiving a response to the sent message via the conversation user interface, wherein the response originates from the mobile terminal, which sends the response with the mobile terminal identifier, the return identifier, and the return identifier extension to the intermediate server, and wherein the intermediate server receives the response and associates the mobile terminal identifier and the return identifier extension with the user identifier that is associated with the general purpose computing device based at least in part on the relationship mapping.

18. A mobile terminal comprising:
a communication interface;
a processor in communication with the communication interface; and
a memory in communication with the processor and storing machine instructions that cause the processor to perform a plurality of operations, including:
receiving a message, including a return identifier and a return identifier extension, wherein the message was originated with a conversation user interface that is temporarily executed by a general purpose computing device during a communication session with the mobile terminal, and wherein the return identifier identifies an intermediary communication device that has established a communication session with the general purpose computing device, and wherein the return identifier extension associates the mobile terminal with a user identifier that is associated with the general purpose computing device, and wherein the association between the return identifier extension and the user identifier is stored in a relationship mapping established at the intermediary communication device; and
returning to the intermediary communication device a response to the received message, the response including the return identifier, the return identifier extension, and a mobile terminal identifier, wherein the intermediary communication device associates the return identifier extension and the mobile terminal identifier with the user identifier based at least in part on the relationship mapping to send the response to the general purpose computing device, and wherein the response is transmitted to the intermediary communication device via the communication interface.

19. A method for messaging between a general purpose computing device and a mobile terminal, comprising:
establishing a communication session with the general purpose computing device and assigning a session identifier to the communication session;
receiving a message and a mobile terminal identifier from the general purpose computing device through a conversation user interface that is temporarily executed by the general purpose computing device;
temporarily storing during the communication session an association between the session identifier, the mobile terminal identifier, and a return identifier extension, wherein storing the association includes establishing a relationship mapping with a plurality of elements, the elements comprising the user identifier, the mobile terminal identifier, and the return identifier extension;
sending the message, including the return identifier and the return identifier extension, to the mobile terminal;
receiving a response to the message, the return identifier, and the return identifier extension from the mobile terminal;
using at least the return identifier extension and the relationship mapping to associate the response with the session identifier; and
sending the response to the general purpose computing device based on the session identifier.

* * * * *